United States Patent [19]

Singer et al.

[11] Patent Number: 4,972,511
[45] Date of Patent: Nov. 20, 1990

[54] RECEIVER TEST APPARATUS WITH TEST MESSAGE INJECTOR

[75] Inventors: Paul A. Singer, Santee; James L. Conrath, San Diego, both of Calif.

[73] Assignee: The United States of America as represented by the Secretary of the Navy, Washington, D.C.

[21] Appl. No.: 280,057

[22] Filed: Dec. 5, 1988

[51] Int. Cl.$^5$ .................... H04B 17/00; H04B 7/00
[52] U.S. Cl. .................................. 455/226; 455/249
[58] Field of Search ............. 455/226, 249, 186, 67; 371/22.5, 23, 27

[56] References Cited

U.S. PATENT DOCUMENTS

| | | | |
|---|---|---|---|
| 4,173,000 | 10/1979 | Singer et al. | 331/78 |
| 4,322,857 | 3/1982 | Grohmann et al. | 455/226 |
| 4,419,622 | 12/1983 | Cuneo, Jr. et al. | 455/226 |
| 4,506,332 | 3/1985 | Bloch et al. | 455/226 |
| 4,625,332 | 11/1986 | Singer et al. | 455/67 |
| 4,627,103 | 12/1986 | Fukuhara | 455/226 |
| 4,630,266 | 12/1986 | Deparis et al. | 370/94 |
| 4,654,807 | 3/1987 | Bremer | 364/551 |

*Primary Examiner*—Joseph A. Orsino
*Assistant Examiner*—L. Van Beek
*Attorney, Agent, or Firm*—Harvey Fendelman; Thomas G. Keough; Peter A. Lipovsky

[57] ABSTRACT

A receiver test apparatus that injects a plurality of attenuated test signals into a receiver under test is improved by contemporaneously injecting a test message to identify the level of the attenuation test signals so that an operator may easily identify the level at which receiver anomalies occur. The test signals and messages are programmed so that testing may be easily reproduced.

16 Claims, 5 Drawing Sheets

RECEIVER TEST APPARATUS WITH TEST MESSAGE INJECTOR

STATEMENT OF GOVERNMENT INTEREST

The invention described herein may be manufactured and used by or for the Government of the United States of America for governmental purpose without the payment of any royalties thereon or therefor.

BACKGROUND OF THE INVENTION

1. Field of the invention

This invention pertains broadly to the field of telecommunications. More particularly, the invention pertains to telecommunication receivers. In still greater particularity, the invention relates to a receiver test apparatus for accurately determining receiver response. In yet still greater particularity, the invention relates to a telecommunications receiver test apparatus for injecting programmed attenuated test signals containing test identification messages.

2. Description of the prior art

The response of a telecommunications receiver is crucial to the reception of a clear and concise transmitted message. However, crowded transmission channels and the abundance of ambient noise have made clear and concise reception a challenge for even the most skilled telecommunications engineers.

As a consequence of this challenge, receiving equipment is thoroughly checked to determine how close receiver output is to transmission input.

In the past, a receiver test device permitted an operator to inject a receiver with transmission signals of known attenuation levels. The operator of the receiver under test would then compare a strip chart recording of the receiver response with the known inputted test signals. Changes in received attenuated test signals from one level to another were predicted upon the operator noting the lapsed test transmission time and comparing this time with the test signal programmed to take place at that point in the test transmission sequence.

In circumstances in which the receiver under test was injected with a large sequence of test values, it became increasingly more difficult for operators to determine where in the test sequence response anomalies occurred. This difficulty in turn made prolonged reproducible tests at a desired point in the test sequence extremely difficult, so that a determination as to whether the response error was caused by a receiver fluke or by a receiver malfunction could not easily be made.

SUMMARY OF THE INVENTION

The invention substantially overcomes the above described deficiencies by providing an attenuated test signal that includes a contemporaneous message corresponding to the amount of attenuation imparted to the test signal. The simultaneous injection of the message with the test signal makes it easy for an operator of a system under test to determine at what attenuated test level unexpected receiver responses occur. This invention is an improvement of the programmable time varying attenuator patented by the inventors Paul A. Singer and James L. Conrath in U.S. Pat. No. 4,625,332, incorporated by reference herein.

A first embodiment of the invention includes a programmable attenuator operably coupled to a test message injector and a modulator for modulating a message with a generated carrier signal. The programmable attenuator provides a sequence of programed attenuation test signals each of which are injected for preselected time periods. The attenuator is coupled to the test message injector to trigger an attenuation message to be injected with the attenuated signal. Synchronization of the attenuated signal with the attenuation message is provided by a mutually linked timing standard.

A second embodiment includes a continuous wave noise generator, the output of which is first selectively attenuated in the above referred to programmable attenuator and that is then combined with an attenuation message in a channel simulator. The combined signal is output from the channel simulator to be injected into the receiver under test. This embodiment closely approaches typical ambient reception environments as the noise generator and channel simulator provide expected receiver background disturbances.

Each of these embodiments of the invention includes an attenuation message function to facilitate the testing of the telecommunications receiver.

OBJECTS OF THE INVENTION

It is an object of the invention to provide an improved telecommunications receiver test apparatus.

Another object of the invention is to provide an improved receiver test apparatus that injects a receiver under test with a test signal that includes a test identification message.

Yet another object of the invention is to provide an improved telecommunications receiver test apparatus that injects a receiver under test with an attenuated test signal that includes a message corresponding to the amount of attenuation imparted to the test signal.

Other objects, advantages and new features of the invention will become apparent from the following detailed description of the invention when considered in conjuction with the accompanied drawings.

DESCRIPTION OF THE PREFERRED EMBODIMENTS

Figure 1:
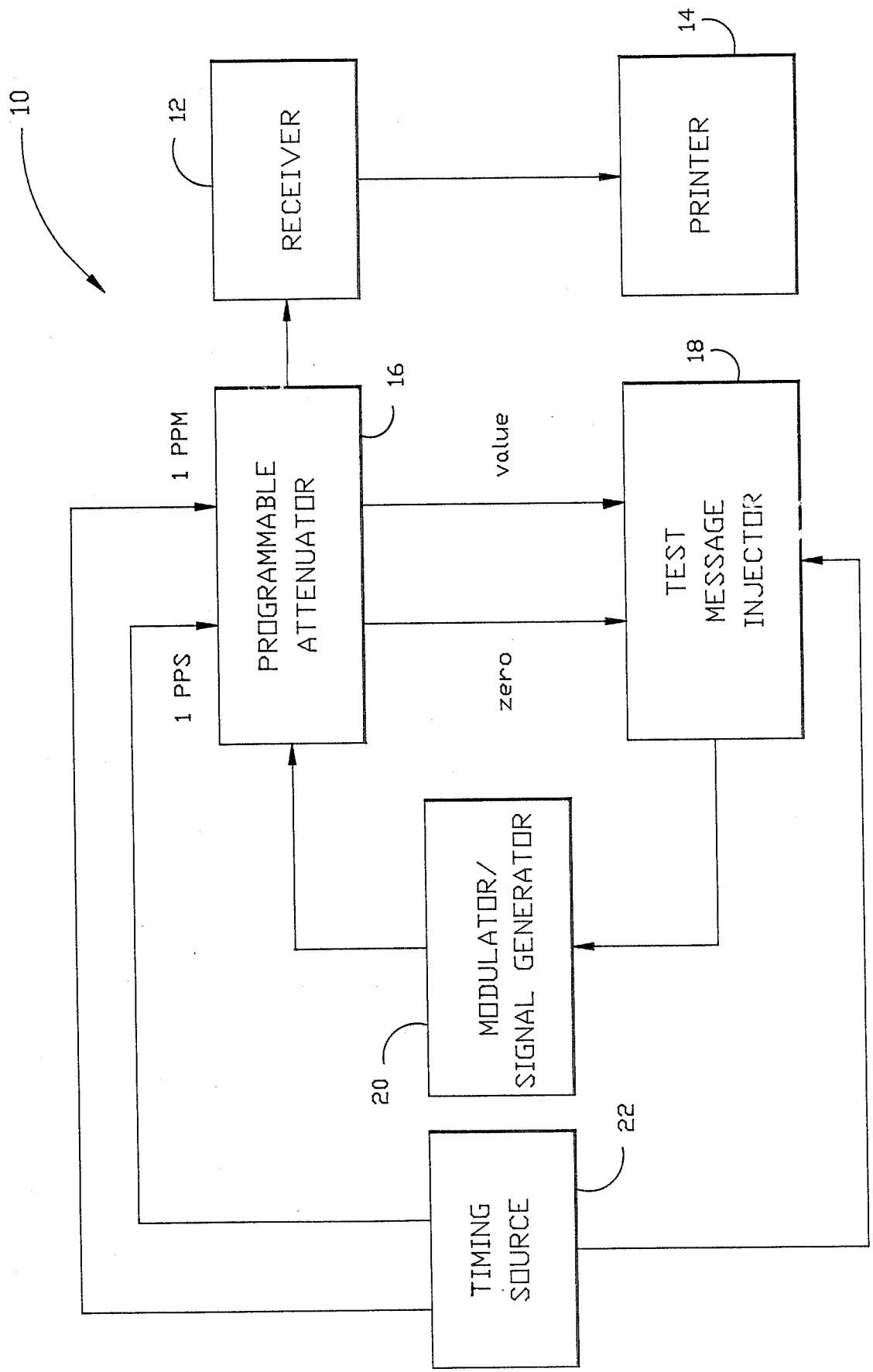
FIG. 1 is a block diagram representation of a first embodiment of the invention shown operably coupled to a telecommunications receiver under test.

Referring to FIG. 1 a receiver test apparatus with a test message injector is shown generally at 10. Apparatus 10 is operably coupled to a telecommunications receiver 12 to be tested. A printer such as a strip chart recorder 14 may be coupled to the receiver to provide a historical account of the receiver response.

A first embodiment of the invention, depicted in FIG. 1, includes a programmable attenuator 16, a test message injector 18, a modulator 20 and a timing source 22.

Figure 2:
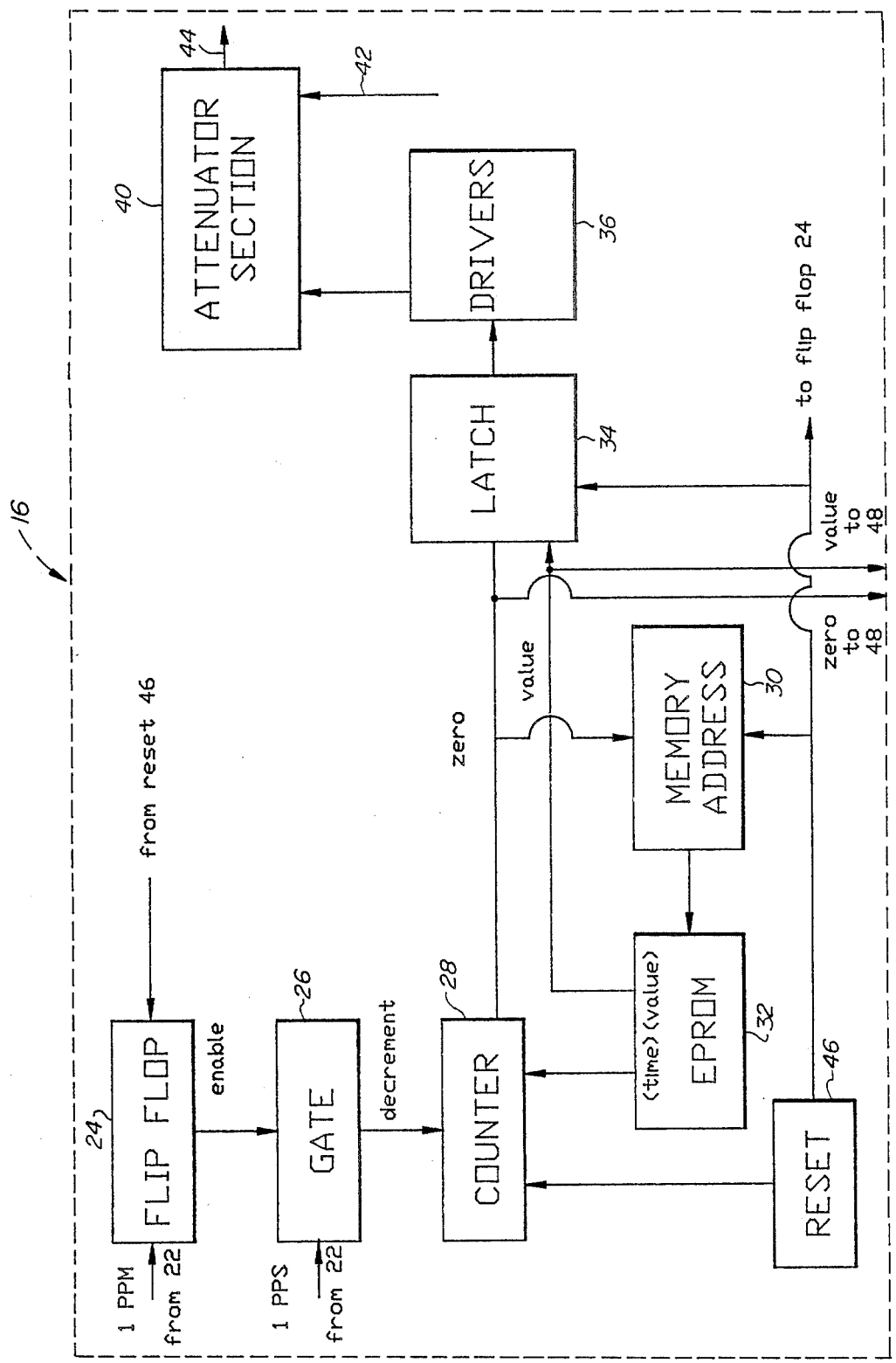
FIG. 2 is a schematic of the programmable attenuator that is incorporated within first and second embodiments of the invention.

In FIG. 2 a schematic representation of programmable attenuator 16 is shown. Programmable attenuator 16 controls the test level output which is input to receiver 12 under test.

Referring now to both FIGS. 1 and 2, programmable attenuator 16 begins operation by receiving a one pulse per minute pulse sequence from timing source 22 to a flip flop 24. Flip flop 24 is operably coupled to a gate 26 which is enabled upon the flip flop receiving the minute pulse. Gate 26 is operably coupled to timing source 22 to receive a one pulse per second pulse sequence. The enablement of gate 26 permits the one pulse per second from timing source 22 to be decremented in a counter 28. A countdown within counter 28 to zero causes a memory address 30 to provide an address to a first erasable programmable read only memory (EPROM) 32. EPROM 32 is preprogrammed with a plurality of time variable attenuation control signals. These control signals each have an attenuation value component, such as a six bit value, and an attenuation time period component that corresponds to the value component. The attenuation value component is applied to a latch 34 for the duration of the attenuation time period corresponding to the attenuation value. This time is clocked out in counter 28. A countdown to "zero" in counter 28 causes memory address 30 to provide a new address to EPROM 32. A new attenuation value will then be applied to latch 34 for the corresponding new attenuation time period.

In this manner EPROM 32 provides a succession of programmable time variable attenuation control signals to be applied to latch 34. The output of latch 34 is input into a driver 36 which provides drive capability to an attenuator section 40. Upon receipt of attenuation control signals from EPROM 32, attenuator section 40 varies the test signal level at the input of receiver 12 so that the receiver can be tested through its full operating range. In this embodiment of the invention, attenuator section 40 modifies carrier signals that are generated within modulator 20 and input into attenuator section 40 as 42. These carrier signals may be, for example, of radio frequencies. Attenuated signals 44 are output from attenuator section 40 in a precise repeatable fashion, making accurate, repeatable tests of receiver 12 possible.

The above described elements of programmable attenuator 16 are connected in accordance with established techniques and are available from commercial sources. For example, elements that have served satisfactorily for purposes of the invention include a flip flop 24 being a 74LS74, the gate 26 being a 74LS00, the counter 28 being a 74LS193, the memory address 30 being a 74LS193, and the EPROM being a standard integrated circuit such as a 2732. In addition, latch 34 may be a suitably connected 74LS375, driver 36 being a suitably connected 7407 and attenuator section 40 being a commercially available unit for the amplitude modulation of a signal. This unit, such as a model PA51 programmable attenuator, is available through Texcan Corporation of Phoenix, Ariz. This attenuator provides amplitude modulation upon receiving an attenuation control signal.

Additionally incorporated within programmable attenuator 16 is a reset circuit that may include a manual reset button such as 46. Reset button 46 is operably coupled to counter 28, memory address 30, latch 34 and flip flop 24 so that the testing of receiver 12 can begin at a known cleared state. Activation of programmable attenuator 16 after reset will cause the first attenuation control value programmed into EPROM 32 to be applied to latch 34 and the corresponding time period within EPROM 32 to be counted down within counter 28. Decrementing to zero within counter 28 will cause memory address 32 to access sequential addresses to EPROM 32 so that a plurality of attenuation values are applied to latch 34 for the time periods corresponding to the attenuation values.

Figure 3:
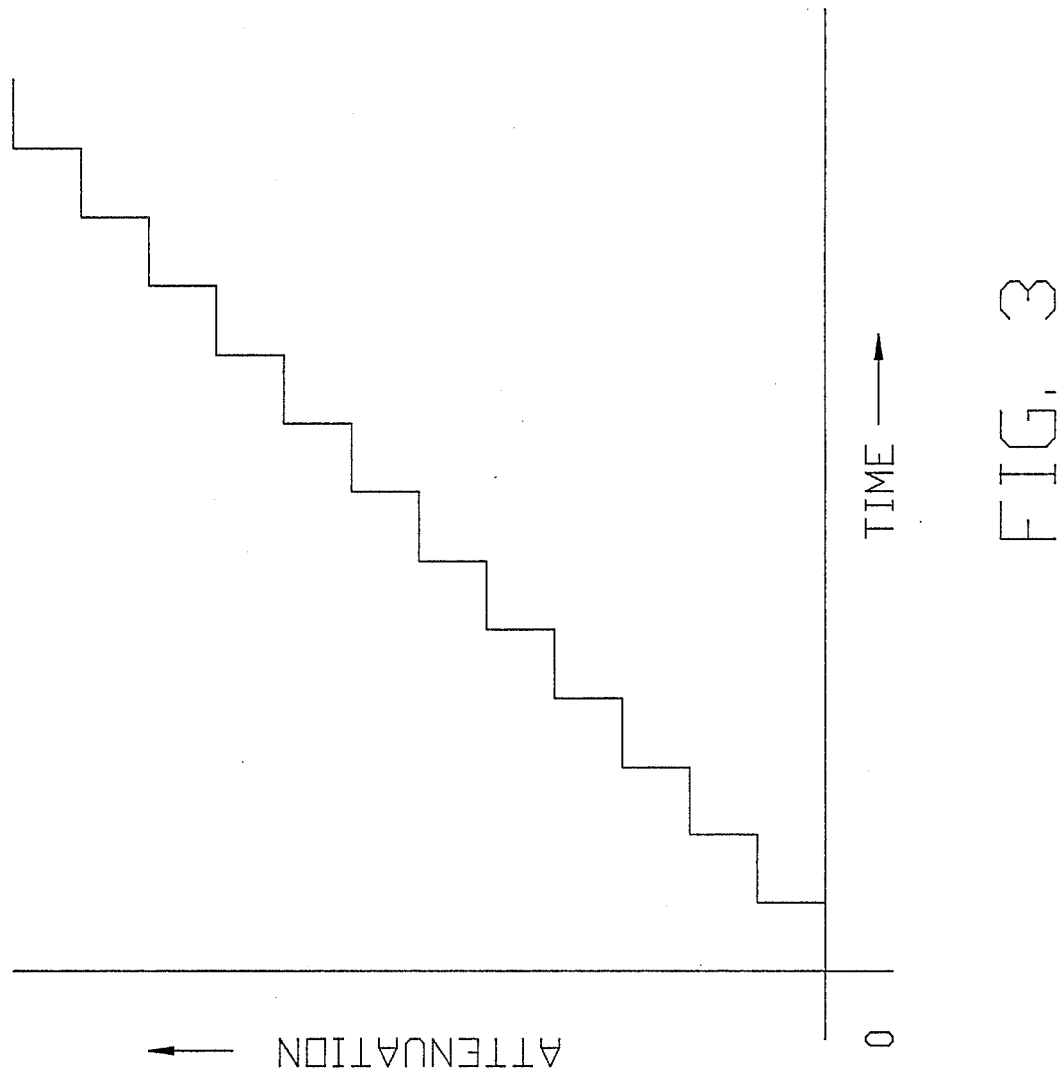
FIG. 3 is a representative attenuation curve typical of that programmed within the programmable attenuator of the invention.

In FIG. 3, a profile of a representative sequence of attenuation values and corresponding attenuation time periods such as those that may be programmed within first EPROM 32 is shown. A sequence such as that depicted in FIG. 3, when programmed within EPROM 32 of the invention, would provide a succession of increasing attenuated test signals to be applied to a receiver so that the receiver may be tested through its full operating range.

Functioning parallel to and simultaneously with programmable attenuator 16 is test message injector 18. Test message injector 18 provides an operator of a receiver under test with an information message pertaining to the attenuation test signals injected by programmable attenuator 16.

Figure 4:
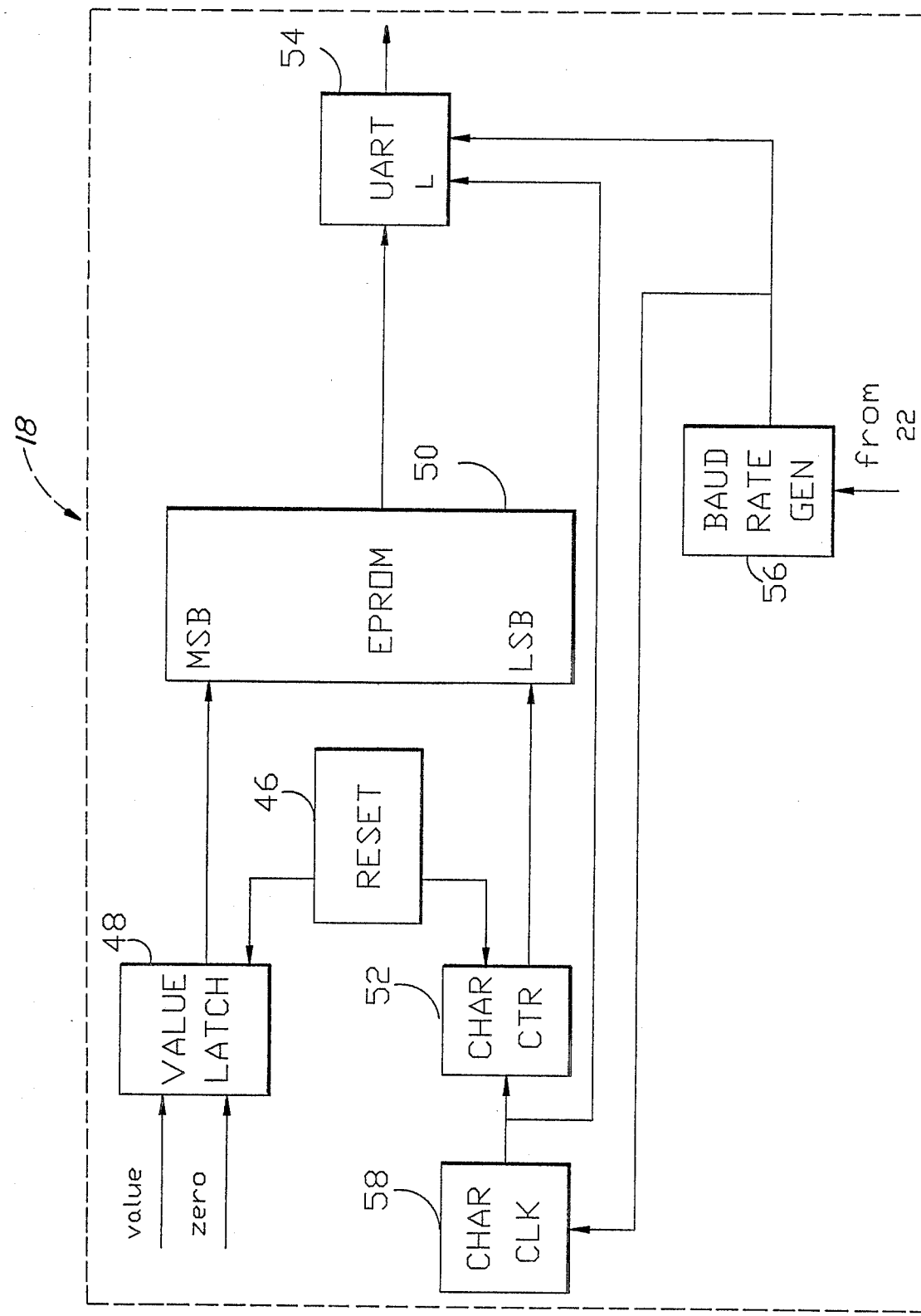
FIG. 4 is a schematic representation of the test message injector incorporated within both embodiments of the invention.

Referring now to FIGS. 1 and 2, and FIG. 4, the latter being a schematic representation of test message injector 18, it can be seen that the "zero" that counter 28 produces each time the counter counts through a zero value is taken to test message injector 18 as a control signal for a value latch 48 of the injector. When the zero control signal is present, the attenuation "value" from first EPROM 32 is latched into value latch 48. The value latched in latch 48 is applied to the most significant bits (MSB) of a message address of a second EPROM 50.

EPROM 50 is programmed with a plurality of messages each of a preselected character length. These messages can be constructed to identify the attenuation control signal values used to set the attenuation levels of programmable attenuator 16. Put another way, the attenuation level value programmed within EPROM 32 represents a unique attenuator setting that is used to select a message within second EPROM 50 that will alert the operator as to what the attenuator setting is. By providing this attenuation identification information to the operator of a receiver under test, the operator may easily identify attenuation levels at which receiver anomalies occur. The programmable features of test message injector 18 and programmable attenuator 16 permit an operator to accurately reproduce the testing of receiver 12 to determine whether receiver anomalies are due to transient receiver flukes or to receiver degradation.

For example, an injected attenuated test signal may be identified as having a signal-to-noise ratio (SNR) of 10 and this information may be coupled to additional information so that the operator may see whether the message is being received as transmitted or whether distortion of the message has occurred. Below represents one possible set of outputs as seen by the receiver test operator on a printer coupled to the tested receiver.

QUICK BROWN FOX ... SNR=10 SNR=10

QUICK BROWN FOX ... SNR=09 SNR=09

QUICK BROWN FOX ... SNR=08 SNR=08

QUICK GROWN FTX... SNR=07 HNR=07

TRICN BRXVX FOT... SWX=;06XNR=LS

The operator would observe where errors in transmission reception begin. For the above printout he would know that the system operates at a SNR of 8 with no errors. Upon repeating the test, if errors appeared at a SNR of 8 or lower, the operator would know that the receiver has begun to degrade.

Referring again to FIG. 4, the individual characters or least significant bits (LSB) of each EPROM 50 message selected by value latch 48 is counted out by a character counter 52.

For example, second EPROM 50 may contain 64 independent messages each being 64 characters long. Upon selection by value latch 48 of an individual message, character counter 52 will generate 64 addresses to EPROM 50, each memory address containing one character of the message. Cycling of character counter 52 will cause all 64 characters of the message to be output from second EPROM 50 as a parallel data stream. This parallel stream is converted to a serial stream by a universal asynchronous receiver transmitter (UART) 54 and by an operably connected baud rate generator 56. Baud rate generator 56 is coupled to timing source 22, dividing pulses from timing source 22 down to a preselected baud rate. A character clock 58 is coupled to baud rate generator 56 to provide a character timing pulse for character counter 52. Synchronization of the conversion within UART 54 is provided by operably coupling the timing pulses from character clock 58 to the load line (L) of UART 54. For example, where EPROM 50 was selected to have a baud character set of 5 bits per character, UART 54 was chosen of a 7.0 unit, 5 level code with character clock 58 providing a "divided by" seven function.

Components of test message injector 18 are all commercially available and are connected according to established techniques. For example, value latch 48 is a 74LS116, EPROM 50 is a standard integrated circuit such as a 4096×8, character counter 52 is a 74LS161, UART is a 54 is a 8251, baud rate generator 56 is a TM 1135 and character clock 58 is a CD4018B.

Reset 46 provides a clearing function of value latch 48 and character counter 52.

Referring to FIG. 1, injection of an attenuated test signal from programmable attenuator 16 is near simultaneously made with an attenuation message from test message injector 18. This message is a serial data stream modulation signal that is modulated in modulator 20 with a carrier signal generated within the modulator. The message modulated signals are passed through programmable attenuator 16 to be injected into receiver 12 under test. Modulator 20 is any of an established design that provides the modulation of an internally generated carrier signal such as an RF signal.

Timing source 22 may be a cesium standard to provide precise pulse rates for component timing and synchronization.

Figure 5:
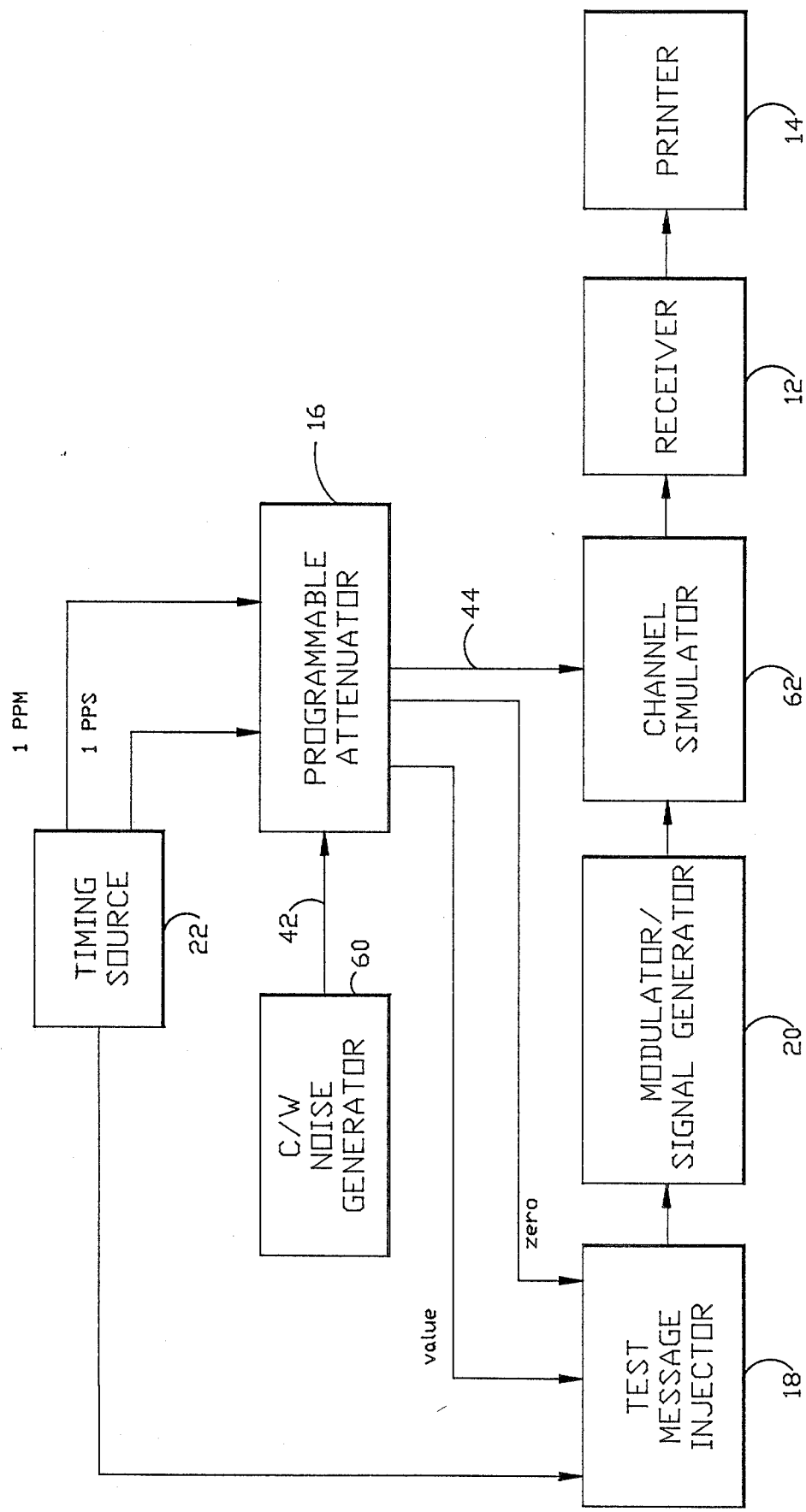
FIG. 5 is a block diagram of a second embodiment of the invention incorporating a continuous wave noise generator and a channel simulator.

Referring to FIG. 5, there is shown a second embodiment of the invention incorporating a continuous wave noise generator 60 and a channel simulator 62. The addition of these two elements to those of the first embodiment permits attenuated test signals more closely representing ambient transmissions to be injected into a receiver under test. Continuous wave noise generator 60 provides a continuous train of noise signals 42 to be attenuated by programmable attenuator 16. As with the first embodiment of the invention, the attenuation control value and "zero" from programmable attenuator 16 are used to coordinate the generation of a corresponding test message modulation signal within test message injector 18. Again, as with the first embodiment of the invention, the serial data stream from test message injector 18 is modulated with a generated carrier frequency within modulator 20. Synchronization of programmable attenuator 16 and test message injector 18, like in the first embodiment of the invention, is provided by timing source 22.

Output 44 from programmable attenuator 16 and the message modulated signals 64 from modulator 20 are combined in channel simulator 62 for input into receiver 12.

Channel simulator 62 conditions the attenuator test signals 44 from programmable attenuator 16 and the test message signals 64 from test message injector 18 to more closely approach signals as they would appear from atmospheric transmissions. Put another way, characteristics that are commonly imparted upon signals as they travel through the atmosphere are impressed upon the signals combined within channel simulator 62 to make them more realistic in appearance upon presentation to receiver 12 under test. The make of the channel simulator 62 is not critical to the understanding of the second embodiment of the invention other than that channel simulator 62 provides signal conditioning that more closely approaches atmospheric transmissions.

A channel simulator suitable for this purpose is known as a Simulated VLF/LF Noise Generator and is described by inventors Paul A. Singer and Roger K. Cernius in U.S. Pat. No. 4,173,000 incorporated by reference herein.

The signals provided by continuous wave noise generator 60 and test message injector 18 are ultimately combined in channel simulator 62. These signals may, of course, be of radio frequency.

In a manner like that of the first embodiment of the invention, the attenuated test signals identified by preselected test messages are injected into receiver 12 with the response of receiver 12 being recorded by printer 14 for operator evaluation.

It is thus seen that an operator may inject a plurality of reproducible test signals into a telecommunications receiver to assess the response of the receiver. In accordance with the invention, the specific test signals injected are identified so that an operator may easily ascertain at what test level receiver anomalies occur. By identifying a test level at which questionable receiver operation occurs, the operator may easily reproduce a test at this level to assess whether the receiver response is due to receiver degradation or due to a transient fluke.

Obviously, many modifications and variations of the invention are possible in the light of the above teachings. It is therefore to be understood that within the scope of the appended claims the invention may be practiced otherwise than as specifically described.

What is claimed is:

1. An apparatus for injecting an information-tagged attenuated signal into a communications receiver comprising:

generating means for generating a signal:
   attenuating means operably coupled to said generating means, for attenuating said signal and thereby generating an attenuated signal;

attenuation information producing means operably coupled to said attenuating means for producing a modulation signal containing information corresponding to the amount of attenuation imparted to said signal by said attenuation means; and modulating means operably coupled to said generating means and to said attenuation information producing means for modulating said signal with said modulation signal.

2. An apparatus of claim 1 in which said generating means generates a radio frequency signal.

3. An apparatus of claim 1 in which said attenuating means includes a erasable programmable read-only memory (EPROM) containing an attenuation value stored therein corresponding to the amount of attenuation imparted to said signal by said attenuating means.

4. An apparatus of claim 3 in which said attenuation information producing means includes an EPROM containing information stored therein corresponding to the attenuation value stored within said EPROM containing said attenuation value.

5. An apparatus for injecting an information-tagged attenuated test signal into a communications receiver comprising:

generating means for generating a signal;

attenuation control means for providing an attenuation control signal;

attenuating means operably coupled to said generating means and to said attenuation control means, for attenuating said generated signal with said attenuation control signal thereby generating an attenuated signal;

information signal producing means operably coupled to said attenuation control means, for producing a modulation signal corresponding to the degree of attenuation provided by said attenuation control signal; and modulating means operably coupled to said information signal producing means and to said generating means, for modulating said generated signal with said modulation signal.

6. An apparatus of claim 5 in which said generating means generates a radio frequency signal.

7. An apparatus of claim 6 in which said attenuation control means includes an erasable programmable read-only memory (EPROM) containing an attenuation value stored therein corresponding to the amount of attenuation imparted to said signal by said attenuation means.

8. An apparatus of claim 7 in which said information signal producing means includes an EPROM containing information stored therein corresponding to the attenuation value stored within said EPROM containing said attenuation value.

9. An apparatus of claim 8 in which said attenuation value is one of a plurality of attenuation values and in which said information is one of a plurality of information, said information pertaining individually to the attenuation values stored within said EPROM containing said plurality of attenuation values.

10. An apparatus for injecting time-variable, information-tagged attenuated test signals into a communications receiver comprising:

generating means for generating a signal;

attenuation control signal means for providing time-variable attenuation control signals;

attenuating means operably coupled to said generating means and to said attenuation control signal means for attenuating said generated signal according to said time-variable attenuation control signals;

attenuation information signal producing means operably coupled to said attenuation control signal means for producing information modulation signals corresponding to the degree of attenuation provided by said attenuation control signals;

modulation means operably coupled to said attenuation information signal producing means and to said generating means, for modulating said generated signal with said information modulation signals; and timing means operably coupled to said attenuation control signal means and to said attenuation information signal producing means, for assuring a desired timing therebetween.

11. The apparatus of claim 10 in which said generated signal is a radio frequency signal.

12. The apparatus of claim 11 in which said means for providing said time-variable attenuation control signals includes a first erasable programmable read-only memory (EPROM), said first EPROM being programmed with preselected attenuation control values and preselected attenuation time periods, each of said preselected attenuation control values having a corresponding preselected attenuation time period.

13. The apparatus of claim 12 in which said first EPROM is operably coupled to a latch circuit, said first EPROM and said latch circuit being operably coupled to a counter, and said counter being operably coupled to said timing means, so that a programmed preselected attenuation time period output from said first EPROM is counted in said counter and so that a programmed preselected attenuation control value output from said first EPROM is loaded into said latch for said programmed preselected time period, said counter being operably coupled to a memory address circuit and said memory address circuit being operably coupled to said first EPROM to initialize a succession of said programmed preselected attenuation control values and said programmed preselected attenuation time periods to be output from said first EPROM.

14. The apparatus of claim 13 in which said attenuation information signal producing means includes a second EPROM containing information stored therein corresponding to the attenuation value stored within said first EPROM.

15. The apparatus of claim 14 in which said second EPROM is operably coupled to a second latch circuit, said second latch circuit for addressing individual messages of information within said second EPROM, said second EPROM being operably coupled to a second counter for counting through said individual messages, said second counter being operably coupled to said timing means to assure a desired timing relationship therebetween, said second latch circuit receiving said attenuation values from said first EPROM for said attenuation time periods and addressing said second EPROM thereupon so that modulated signals containing information stored within said second EPROM and corresponding to said attenuation values stored within said first EPROM is output from said second EPROM to be modulated with said signal.

16. The apparatus of claim 15 in which said modulated signals are input into a parallel-to-serial converter, said parallel-to-serial converter being operably coupled to said timing means for assuring a desired rate of input into said parallel-to-digital converter, and to a rate generator, also operably coupled to said timing means, for selectively adjusting the output rate of said parallel-to-serial converter.

* * * * *